United States Patent Office 2,756,069
Patented July 24, 1956

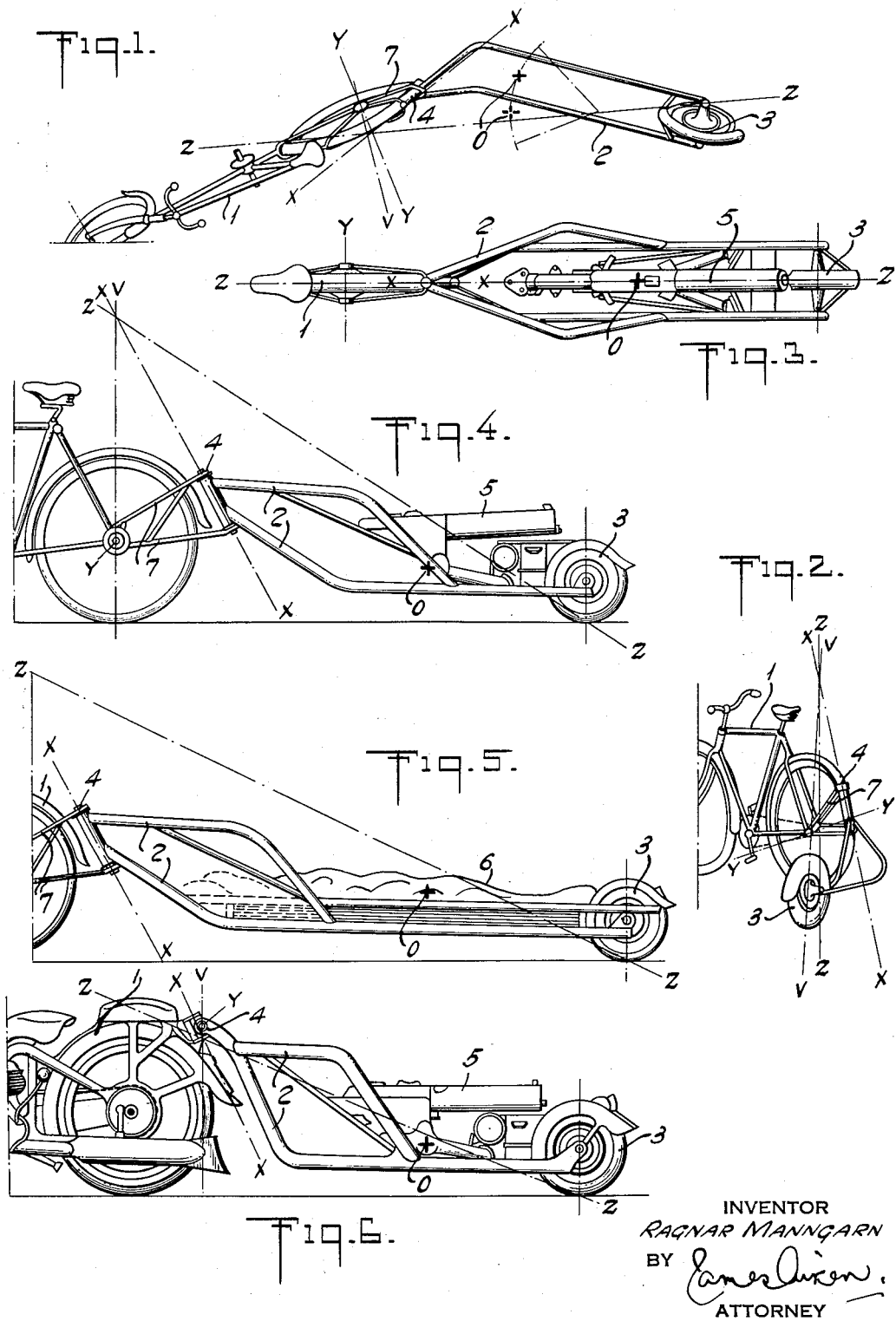

2,756,069

BICYCLE TRAILER

Ragnar Manngarn, Vasteras, Sweden

Application July 7, 1952, Serial No. 297,416

Claims priority, application Sweden July 7, 1951

2 Claims. (Cl. 280—204)

Single wheel trailers intended to be coupled to bicycles or similar vehicles have hitherto not come into general use due to the fact that the constructions hitherto employed for such trailers have influenced the maneuverability and stability of the pulling vehicle in an unfavorable sense.

The present invention has for its object to provide a trailer having a coupling device and so constructed that the pulling vehicle is favorably influenced by the trailer as regards its maneuverability and balancing.

The trailer consists for instance of a frame and a wheel journaled therein. The frame is further constructed for supporting a load, and it may be connected to the pulling vehicle by two axes forming an angle with each other, one of which lies in a vertical plane through the longitudinal direction of the pulling vehicle but is preferably inclined against the vertical direction, while the other axis lies in, above or behind the center of the rear wheel of said vehicle.

The wheel of the trailer may be replaced by a runner in the shape of a rail or ski. The trailer may further have means for supporting a detachable load, as a weapon or a stretcher, or it may represent the entire load by itself. The frame of the trailer may be elastic or may have springs for shock damping. It may also be constructed as a loading receptacle or passenger cabin.

The pulling vehicle may be an ordinary bicycle, a motor cycle, or another vehicle. A vehicle having three or more wheels can be provided with a pulling connection for two or more trailers. The axis system for the flexible connection may be connected to the normal frame of the pulling vehicle or to a baggage carrier or the like thereon.

In the accompanying drawing, Figs. 1 and 2 show in a plan view and in an end view, respectively, an ordinary bicycle with a trailer connected thereto during a turning movement. Figs. 3 and 4 show in a plan view and in a side view, respectively, a trailer with a machine gun mounted thereon and the rear portion of a bicycle frame to which the trailer directly is connected. Fig. 5 shows in a side view a corresponding trailer with a stretcher. Fig. 6 shows a side view of a trailer similar to that of Fig. 4 but connected to a baggage supporter of a motor cycle.

In the figures, the numeral 1 designates the frame of the pulling vehicle, 2 the frame of the trailer, 3 its wheel which serves as the rear support for the trailer, and 4 the joint for connecting the trailer to the pulling vehicle. The said joint contains two axes X and Y disposed in spaced relation and perpendicularly to each other, the axis Y being horizontal and the axis X somewhat inclined against the normally vertical direction and situated in a longitudinal vertical plane of symmetry of the cycle.

When the vehicle enters a curve, the center of gravity of the load rotates about the inclined axis Z which lies in the plane of symmetry of the trailer and passes through the point of contact of the supporting means 3 with the road and through the point of intersection of the axis X and the line V, which lies in the plane of symmetry of the pulling vehicle and passes through the axis Y perpendicularly to the line of intersection between the plane of symmetry of the pulling vehicle and the plane of the road.

The center of gravity of the load lies below the axis Z.

In Figs. 1–5, the trailer is joined to a bow 7 which is tiltable about the axis of the rear wheel, which axis therefore is designated by Y. In Fig. 6, the axis Y is stationary with respect to the frame, secured for instance to a baggage holder.

When the pulling vehicle enters a curve to the left, as shown in Figs. 1 and 2, the center of gravity O of the trailer load is rotated around the axis Z and thereby raised, whereby it will give a torque which tends to restore the vertical position of the vehicle, in which it is assisted by the gyral forces acting in a well-known manner.

In entering a curve, the center of gravity of the pulling vehicle is lowered in a well-known manner, but as the center of gravity of the trailer is simultaneously raised as described above, there will be an equalizing of speed on account of the compensation of the potential energy.

The load of the trailer in Figs. 3 and 4 consists of a machine gun 5 and in Fig. 5 of a stretcher 6. In all the cases, the center of gravity O of the load lies below the axis Z. The trailer may, as aforesaid, have a receptacle for various kinds of load, as munition, or a cabin for the transport of a person.

In passing irregularities in the road, the trailer mainly swings about the horizontal axis Y. A certain turning around this axis also taken place in curves on account of the inclination of the axis X against the vertical direction.

The loading capacity of this trailer is, as that of a bicycle, limited, but it can be increased if the vehicle is constructed in the right way and may, especially if the load is efficiently secured in place, considerably exceed what has hitherto been possible in cycle transportation. An appropriate design of the trailer, which does not disturb the maneuverability of the pulling vehicle, makes it possible to employ a motor cycle. As examples of possible uses of the invention, uses for military purposes may be first mentioned, as transport of heavy machine guns, shell throwers, trench mortars and munition or of wounded persons. For these purposes, it has the advantage of being transported on forest tracks and similar paths, and further the trailer may be drawn separately on rugged or loose ground, when the frame thereof has been built as a sledge with one or two runners, especially for winter use. The placing of the wheel axle above the frame facilitates the transport. For civil purposes the trailer can also be used in many cases, as for the transport of ladders, welding aggregates or other comparatively small devices.

I claim as my invention:

1. A trailer for use with a pulling vehicle of the character described, comprising a frame, a support for said frame located at the rear end thereof and tiltable sidewise with respect to the supporting road surface, and a joint connecting said frame with said vehicle and including two hinge axes, one of which is inclined upwardly and forwardly with respect to said road surface and the other of which is normally horizontal and is perpendicular to the said inclined axis, and in which during its sidewise tilting movement the trailer turns about a third axis which is located in the upright plane of symmetry of the pulling vehicle and above the center of gravity of the trailer, the said third axis passing through the point about which the said rear support of the trailer is tilted and through the point of intersection of a straight line coinciding with said forwardly inclined hinge axis and a vertical line located in the plane of said vehicle and passing through the said horizontal axis and said twisting motion serving to raise the center of gravity of the trailer when the pulling vehicle describes a balancing movement in making a curve, said trailer thus causing a torque tending to stabilize the pulling vehicle.

2. A trailer comprising a frame, supporting means disposed at the rear end of the frame and permitting sidewise tilting thereof, a coupling connecting said frame with the pulling vehicle and containing two hinge axes at right angles to each other, one of said axes being parallel with the axis of the rear supporting wheel of the pulling vehicle and the other axis being disposed in the upright plane of symmetry of the pulling vehicle and sloping in such a direction as to bring the upper extension of said axis forwardly of its lower extension in the direction of travel of the vehicle, thus causing said frame to describe a twisting motion serving to raise the center of gravity of the trailer during any departure of the pulling vehicle and the trailer from true alignment with each other, and in which the trailer during its sidewise tilting movement turns about an axis located in the upright plane of symmetry of the pulling vehicle, and the center of gravity of the trailer is disposed below said axis, which axis passes through the point of contact of the rear trailer supporting means with the road surface and through the point of intersection of a straight line coinciding with said forwardly inclined hinge axis and a vertical line in the plane of said vehicle and passing through the hinge axis parallel with the rear wheel of the vehicle, and said twisting motion serving to raise the center of gravity of the trailer when the pulling vehicle describes a balancing movement in making a curve, said trailer thus causing a torque tending to stabilize the pulling vehicle.

References Cited in the file of this patent

UNITED STATES PATENTS

| | | |
|---|---|---|
| 2,060,066 | Goin | Nov. 10, 1936 |
| 2,163,999 | Jacks | June 27, 1939 |
| 2,647,761 | Kentz | Aug. 4, 1953 |

FOREIGN PATENTS

| | | |
|---|---|---|
| 26,310 | Great Britain | of 1909 |
| 422,768 | Great Britain | Jan. 17, 1935 |
| 834,947 | France | Sept. 12, 1938 |
| 843,404 | France | Mar. 27, 1939 |
| 867,284 | France | July 15, 1941 |